UNITED STATES PATENT OFFICE.

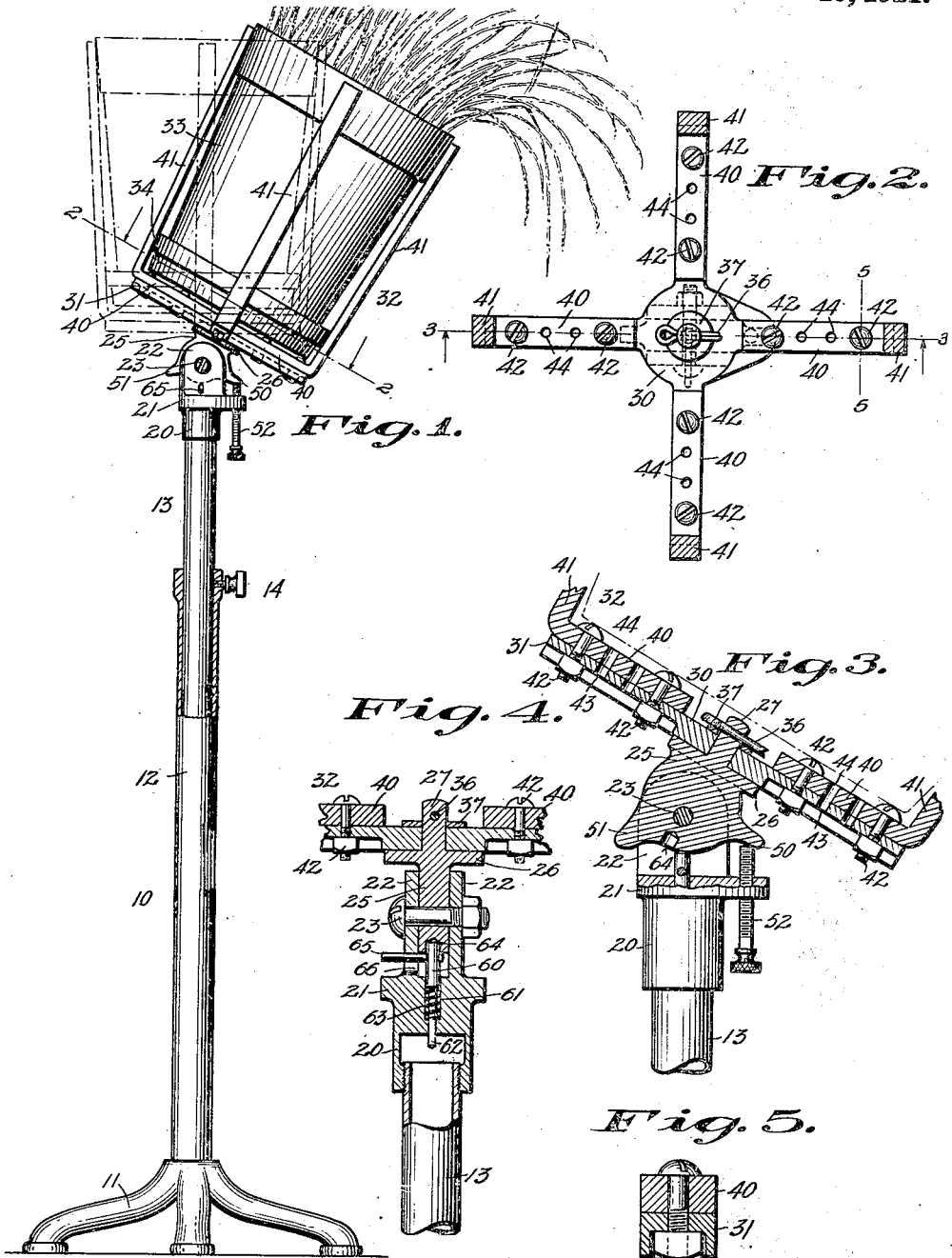

DORR F. LOUDON, OF NEW YORK, N. Y.

PLANT-STAND.

1,371,796.   Specification of Letters Patent.   Patented Mar. 15, 1921.

Application filed May 15, 1920. Serial No. 381,696.

*To all whom it may concern:*

Be it known that I, DORR F. LOUDON, a citizen of the United States, and a resident of the city of New York, borough of Manhattan, in the county and State of New York, have invented a new and Improved Plant-Stand, of which the following is a full, clear, and exact description.

The invention relates to plant stands such as shown and described in the Letters Patent of the United States, No. 1,336,307, granted to me on April 6, 1920.

The object of the invention is to provide a new and improved plant stand designed for use in the home, in florists' windows and other places and arranged for holding and displaying potted plants in a proper angular position relative to the sunlight to insure uniform growth and development of the plant in every direction.

Another object is to allow the user to periodically turn the pot holder while in an inclined or angular position to insure proper uniform drooping of the stems and flowers all around the pot and to prevent undue or excessive drooping of any particular portion of the plant and without requiring changing of the latter in the holder.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the plant stand with part of the telescoping standard shown in section;

Fig. 2 is an enlarged sectional plan view of the same on the line 2—2 of Fig. 1.

Fig. 3 is a sectional side elevation of the same on the line 3—3 of Fig. 2;

Fig. 4 is a transverse section of the same with the pot holder locked in vertical position; and Fig. 5 is an enlarged cross section of the pot holder on the line 5—5 of Fig. 2.

The standard 10 of the plant stand is preferably of the telescoping type and comprises a base 11 from which rises a tubular post 12 in which telescopes a tubular section 13 adapted to be fastened in the adjusted position by a set screw 14. On the upper end of the tubular section 13 screws the hub 20 of a head 21 provided with rising lugs 22 supporting a transverse pivot 23. On the pivot 23 is mounted to swing in a vertical plane a carrying and positioning member 25 extending between the lugs 22, and the said member 25 is provided on the top with a table or seat 26 from which rises integrally a centrally disposed pivot 27. On the table or seat 26 rests the central portion 30 of a spider-like base 31 of a pot holder 32 adapted to support a flower pot 33 and its base 34. The central portion 30 of the base 31 is mounted to turn on the pivot 27 and the base is held against displacement on the pivot 27 by a cotter pin 36 and washer 37 or other suitable retaining means engaging the upper portion of the pivot 27 directly above the top of the central portion 30 of the base 31 of the pot holder 32. On the arms of the base 31 of the pot holder 32 are adjustably mounted the horizontal bottom members 40 of arms 41 adapted to engage the sides of the pot 33 and its base 34. In order to permit adjustment of the arms 40 to accommodate pots 33 and bases 34 of different sizes use is made of bolts 42 engaging registering apertures 43, 44, of which the apertures 43 are formed in the arms of the spider-like base 31 and the apertures 44 are formed in the horizontal members 40 of the arms 41. The arms of the spider-like base 31 are preferably made in inverted U-shape to hold the nuts of the bolts 42 against accidental turning, see Fig. 5.

The carrying and positioning member 25 is provided with two spaced lugs 50, 51, of which the lug 50 is adapted to be seated on the upper end of a vertical screw 52 screwing in the head 21. By the use of the screw 52 the carrying and positioning member 25 and the pot holder 32 carried thereby are held in a desired angular position relative to the vertical axis of the stand (as shown in Figs. 1 and 3) so that the sunlight uniformly strikes the plant contained in the pot 33 with a view to insure uniform growth and development of the plant in every direction. By adjusting the screw 52 down or up more or less angularity is given to the carrying and positioning member 25 and the pot holder 32. It will be noticed that when the pot holder 32 is in angular position it can be readily turned on the pivot 27 without requiring a change in the position of the stand 10. In practice, the user of the plant stand gives about a quarter of a turn a day to the pot holder 32 to insure proper uniform drooping of the stems and flowers all around the pot and to prevent undue or excessive drooping of any particular portion of the plant. It is understood that when the flower pot 33 is in angular position the lower portions of the stems and flowers are liable to droop more than those on the top and to prevent a plant from growing unevenly in this manner, the pot holder 32 and with it the pot and the potted plant are periodically turned, as above mentioned. It is further understood that without this arrangement it would be necessary to turn the pot in the holder or to change the position of the stand 10. It will be noticed that in the case of heavy plants it is rather awkward to change the position of the pot in the holder or to change the position of the stand in the room. By the arrangement described the pot holder and the potted plant can be given daily a quarter turn to accomplish the desired result.

It is understood that the table or seat 26 forms a firm support for the central portion of the base of the pot holder 32 and the said table or seat 26 forms an integral part of the carrying and positioning member 25 and is hence not liable to become accidentally detached and is capable of sustaining the weight of the pot holder and supporting a filled heavy flower pot. It will also be noticed that the pivot 27 forms an integral part of the table or seat 26 and is hence not liable to become accidentally detached.

The lug 51 previously mentioned forms a limiting means for limiting the upward swinging movement of the carrying and positioning member 25, and this lug 51 is adapted to abut against the top of the head 21 at the time the pot holder 32 is in a vertical position, as shown in dotted lines in Fig. 1. In order to lock the carrying and positioning member 25 in this vertical position use is made of a locking pin 60 mounted to slide up and down in a recess 61 formed centrally in the head 21 and its hub 20. The locking pin 60 is provided with a depending reduced portion 62 on which is coiled a spring 63 arranged within the recess 61 and bearing against the under side of the pin 60 to normally hold the latter in an uppermost position and in engagement with a recess 64 formed on the bottom of the carrying and positioning member 25, as plainly indicated in Figs. 3 and 4. The pin 60 is provided with a transversely extending handle 65 passing through an elongated slot 66 formed in one of the lugs 22 of the head 21 to enable the user of the plant stand to move the locking pin 60 downward out of engagement with the recess 64 whenever it is desired to unlock the carrying and positioning member 25 and to swing the same into angular position as indicated in Figs. 1 and 3. It is understood that when the carrying and positioning member 25 is swung from the angular position upward into the position shown in Fig. 4 and in dotted lines in Fig. 1, then the locking pin 60 snaps into the recess 64 at the time the pot holder 32 reaches upright position.

From the foregoing it will be seen that from the arrangement described the carrying and positioning member 25 and the pot holder 32 can be readily swung into an angular position and supported therein for the sunlight to act properly on the plant contained in the pot 33, and while the pot holder is in this position it can be periodically turned to prevent drooping of the stems and flowers in lowermost position at the time. When it is desired to show off the plant to visitors or other persons then the carrying and positioning member 25 and with it the pot holder 32 can be swung into upright position and locked therein, and the pot holder can now be turned around on the pivot 27 to permit of conveniently viewing the plant from all sides without the viewer changing position.

Having thus described my invention, I claim as new and desire to secure by Letters Patent:—

1. A plant stand, comprising a support having a head, a carrying and positioning member loosely mounted on a transverse pivot carried by said head, said member being provided on the top with a seat and an integral pivot having a transverse opening and projecting centrally from said seat, a pot holder resting upon the seat and turning freely on its pivot, a cotter pin in the opening of the said pivot, and means for limiting the angular swinging movement of said member.

2. A plant stand, comprising a support having a head, a carrying and positioning member mounted to swing in a vertical plane on said head and provided on its upper face with a seat from which projects an integral pivot, and on its lower face with a recess, a pot holder mounted to turn freely on the pivot, means for securing the pot holder on the pivot, means for limiting the angular swinging movement of said member, and a spring pressed pin provided with a handle and mounted in the said head and adapted to engage the recess of the said member to lock the same in a vertical position.

DORR F. LOUDON.